United States Patent [19]

Melody et al.

[11] Patent Number: 4,664,883
[45] Date of Patent: May 12, 1987

[54] METHOD OF MAKING ELECTROLYTIC CAPACITOR ANODES

[75] Inventors: Brian Melody, Greencastle; Ernest W. Eickelberg, Indianapolis, both of Ind.

[73] Assignee: Emhart Industries, Inc., Indianapolis, Ind.

[21] Appl. No.: 875,175

[22] Filed: Jun. 17, 1986

[51] Int. Cl.$^4$ .............................................. B22F 1/00
[52] U.S. Cl. ............................................ 419/2; 419/34; 419/37; 419/38; 419/63; 204/292; 264/63; 252/512
[58] Field of Search .................. 419/2, 37, 38, 34, 63; 204/292; 264/63; 252/512

[56] References Cited

U.S. PATENT DOCUMENTS 4,059,442  11/1977  Bernard ................................. 419/2
4,347,084  8/1982   Hähn et al. ............................ 419/2
4,483,819  11/1984  Albrecht et al. ....................... 419/2

Primary Examiner—Stephen J. Lechert, Jr.
Attorney, Agent, or Firm—Robert F. Meyer; Carl A. Forest

[57] ABSTRACT

A powder of a film-forming metal, such as tantalum, is combined with a binder of polyethylene oxide and ammonium carbonate. The powder-binder combination is pressed to form an anode body and then heated to about 300° C. for about 4 hours to remove the binder. The polyethylene oxide is a superior binding agent producing anodes of high porosity and strength. The ammonium carbonate reacts with liquid polyethylene oxide to release large quantities of gas which sweeps the polyethylene oxide out of the anode pores, resulting in an unusually small amount of binder residue and yielding capacitors with low d.c. leakage.

10 Claims, No Drawings

METHOD OF MAKING ELECTROLYTIC CAPACITOR ANODES

BACKGROUND OF THE INVENTION

1. Field of the Invention:

The invention in general relates to a method of making pressed anodes for electrolytic capacitors and more particularly to a binder material which results in highly porous and strong anodes which yield capacitors with low d.c. leakage.

2. Description of the Prior Art:

Pressed anode bodies for electrolytic capacitors are generally formed by pressing a powder of film-forming metal, which is usually tantalum. ("Film-forming" means that the metal is capable of forming an oxide film on its surface which acts as a capacitor dielectric.) The anode body is then sintered to form the anode, which is then anodized to add an insulating layer. The finished capacitor is then formed by adding a cathode material and enclosing the anode in a suitable case.

It is known to add a binder to the tantalum prior to pressing. The binder assists in holding the metal particles together and in forming and maintaining pores in the metal as well as reducing frictional wear of the dies and punches. The binder is removed from the pressed body prior to sintering. Binders are chosen for three basic properties: lubricity, adhesiveness and ability in forming pores. The lubricity assists the metal particles in sliding over one another during pressing to form a full, well-formed anode body; the adhesiveness assists in holding the particles together, and the pores lead to higher capacitance and lower E.S.R. in the finished capacitor. The field of binders has been a major research area in the art since a substance that is high with respect to one of the three properties is often low with respect to the others. The binder is usually added to the metal powder in powder form or dissolved in a liquid, with the binder coating the metal powder upon evaporation of the liquid solvent. The binder must be removed after pressing and before sintering, otherwise it will react with the metal and interfere with its film-forming property and result in inferior capacitors with high d.c. leakage.

Polyethylene oxide has been used as a binder in making anodes for solid electrolytic capacitors for many years. With the advent of higher surface area tantalum powders, the removal of polyethylene oxide and other binders from the pressed anode bodies has become increasingly more difficult. When the surface area of the tantalum powder exceeds the range of approximately 8000–10,000 CV/gm, the removal of traditional binder materials such as polyethylene oxide becomes uneconomical due to the quality of the vacuum required in a binder removal furnace (i.e. the high vacuum required cannot be maintained in a cost-effective fashion due to the volume of binder material which much be removed). If higher temperatures are employed in order to drive off the binder an undesirable reaction occurs between the tantalum and the binder which gives rise to poor electrical properties in the finished capacitors (i.e. high d.c. leakage). The maximum temperature range to which tantalum may be heated in contact with binder materials without reaction is 250°–300° C. although anodes are frequently heated considerably hotter once the binder has been removed in order to increase their strength prior to actual sintering.

In order to avoid the high temperature reaction between tantalum anodes and contained binder, volatile materials such a camphor have been used successfully with high surface area tantalum powders, but the use of materials such as camphor results in mechanically weak anodes which are susceptible to crumbling due to rapid evaporation of the binder at room temperature.

SUMMARY OF THE INVENTION

It is an object of the invention to provide a method of making anodes for electrolytic capacitors that results in the efficient removal of binders, such as polyethylene oxide, from anodes pressed from high surface area powder without heating the anode to temperatures which will result in undesirable reactions with the metal anode material.

It is another object of the invention to provide a binder material for film-forming metal powder that is relatively stable at room temperatures and yields pressed anode bodies with high porosity and strength but reacts at temperatures below that which results in degradation of the film-forming metal to produce high volumes of gas to sweep the anode pores of binder material.

We have found that the limitations of polyethylene oxide in conjunction with high surface area powers may be circumvented by the addition of ammonium carbonate to the tantalum-polyethylene oxide mixture used to press the anode bodies. The invention provides a method of making an anode for an electrolytic capacitor comprising the steps of: providing a powder comprised of a film-forming metal, polyethylene oxide, and ammonium carbonate; pressing the powder to form an anode body; and heating the anode body to remove the polyethylene oxide and ammonium carbonate. Preferably, the step of heating the anode body comprises heating to a temperature at which the polyethylene oxide melts.

The invention also provides a method of making porous anodes for electrolytic capacitors comprising the steps of: providing a powder of film-forming metal particles and a binder comprised of a first substance with desirable binder properties and a second substance which in combination with the first substance is sufficiently stable at pressing temperatures to permit the pressing of strong, porous anode bodies and whicjh interacts with the first substance, at temperatures above pressing temperatures but below the temperature at which the film-forming property of the metal will degrade, to produce quantities of gas sufficient to sweep the first substance out of the pores of the anodes; pressing the powder and binder combination to form an anode body, and heating the anode body to a temperature above the pressing temperature and below the temperature at which the film-forming properties of the metal will degrade to remove the binder substances.

The enhanced performance of the mixture of ammonium carbonate and polyethylene oxide over polyethylene oxide alone appears to be due to an interaction between liquid polyethylene oxide and ammonium carbonate which results in the liberation of large quantities of gas. In the pressed anodes, the interaction occurs when the temperature of the binder removal furnace reaches the melting point of polyethylene oxide which immediately causes decomposition of the ammonium carbonate. Numerous other features, objects and advantages of the invention will become apparent from the following detailed description.

DESCRIPTION OF THE PREFERRED EMBODIMENT

According to the present invention, a binder comprising polyethylene oxide and ammonium carbonate is added to a film-forming metal powder and the metal-binder combination is pressed to form anode bodies. The anode bodies are then heated to remove the binder. In the preferred embodiment, the film-forming metal is tantalum and the polyethylene oxide is Carbowax #8000 powder, which is the Union Carbide brand of high molecular weight polyethylene oxide. The decomposition of the ammonium carbonate is more rapid in the presence of liquid Carbowax than when it is used alone. It is noted that the use of ammonium carbonate as a binder without the Carbowax results in anodes which are mechanically inferior with regard to strength. To demonstrate the interaction of liquid Carbowax with ammonium carbonate, the following experiment was performed: Samples of Carbowax, ammonium carbonate, and a mixture of 50% Carbowax plus 50% ammonium carbonate were heated to 82° C. for 30 minutes in a circulated air oven in order to determine weight loss with the results shown in Table 1.

TABLE 1

| Binder | Initial Wt. | Final Wt. | Wt. Loss | % Wt. Loss |
|---|---|---|---|---|
| Carbowax 8000 | 10.014 gm. | 9.970 gm. | .044 gm. | .44% |
| ammonium carbonate | 11.212 gm. | 9.743 gm. | 1.469 gm. | 13.1% |
| average of above | 21.226 gm. | 19.713 gm. | 1.513 gm. | 7.1% |
| Carbowax plus ammonium carbonate | 11.883 gm. | 8.880 gm. | 3.003 gm. | 25.3% |

The evolution of large quantities of gas within anodes containing both Carbowax and ammonium carbonate is believed to "sweep" the Carbowax from the internal portions of the anodes in spite of the low vapor pressure of the Carbowax at temperatures below the range at which reaction with tantalum takes place.

In order to illustrate the advantage of the mixture of polyethylene oxide and ammonium carbonate over polyethylene oxide alone, test anodes were pressed using approximately ¾ gram of tantalum powder having high surface area/weight and containing both types of binder material. The powder used for these experiments was NRC type ZRD with Fansteel TPX wire of 0.020" diameter.

The preferred binder comprised 1.75% Carbowax #8000 powder and 1.75% ammonium carbonate powder and was preferably mixed with the tantalum by mechanical agitation. 25 parts per million (based upon the weight of the tantalum) of dried fumed silica (CAB-*O*SIL EH-5) was added in order to improve flow within the press feeding mechanism. Control anodes containing 3.5% Carbowax #8000 powder mixed with the tantalum powder by means of mechanical agitation were made for comparison. As is known in the art, the pressing was preferably performed at room temperature.

The binder in each case was removed in a furnace having a vacuum of approximately 100 microns during the removal cycle. The control anodes were heated to 350° C. for 1 hour then heated to 500° C. for 4 hours, this being found necessary in order to remove all but a trace of binder prior to the sintering operation (i.e. lower temperatures were found to leave sufficient binder within the anodes so as to cause an unacceptably high pressure within the sintering furnace during the sintering step). The preferred anodes containing the preferred binder of the present invention were exposed to a temperature of 300° C. of 4 hours during the binder removal process.

Anodes of each type were then subsequently sintered in a high vacuum furnace, anodized in 0.1% phosphoric acid at approximately 60 milleamperes/gram, held at voltage for 2 hours and rinsed in de-ionized water. The formation solution temperature was 85°–90° C. The anodes were then wet-cell tested for direct current leakage in 10% nitric acid at 25° C., the leakage current being read after holding the anode at 70% of the formation voltage for 2 minutes. The results are shown in Table 2.

TABLE 2

| Binder | Anode Wt. | Sintering Conditions | CV/Gm. | Formation Voltage | D.C. Leakage $\mu A/\mu FV \times 10^{-5}$ |
|---|---|---|---|---|---|
| C. wax | .719 gm. | 10 min/1800° | 12975 | 70 volts | 674 (av. 6 anodes) |
| C. wax, Am. Carb. | .753 | 10 min/1800° | 12231 | 70 volts | 9 (av. 4 anodes) |
| C. wax | .711 | 15 min/1725° | 10613 | 100 volts | 759 (av. 6 anodes) |
| C. wax, Am. Carb. | .753 | 10 min/1800° | 11553 | 100 volts | 14 (av. 4 anodes) |
| C. wax, Am. Carb. | .739 | 15 min/1650° | 15845 | 70 volts | 26 (av. 4 anodes) |

The results of Table 2 illustrate the superiority of the binder of the present invention for anodes of similar weight and size having similar surface area (CV/gm.) at equal formation voltages of 70 and 100 volts. The ability to produce low leakage level anodes at higher CV/gm. levels is also demonstrated by the anodes containing the binder of the present invention.

Now that the advantages of adding ammonium carbonate to the binder are disclosed, it can be seen that other additives with similar properties might also be used. It is important that the additive be capable of decomposing into high volume of gas and at the same time that it does not itself leave a residue in the pores of the anode which degrades the tantalum. Ammonium carbonate has a molecular weight of about 96 and decomposes into carbon dioxide, water vapor and ammonia gas. It is also important that the components of the binder do not react to yield non-volatile products which remain as contaminants within the anodes at or above about 300° C.

A novel binder and method of using the binder for making pressed anodes for electrolytic capacitors has been described. It is evident that those skilled in the art may now make many uses and modifications of the specific embodiment described, without departing from the inventive concepts. For example, other substances may be added to enhance or modify some aspect of the invention or anode forming process. Or other steps may be added to the method. Consequently, the invention is to be construed as embracing each and every novel feature and novel combination of features present in the method and binder described.

What is claimed is:

1. A method of making an anode for an electrolytic capacitor, comprising the steps of:
    providing a powder comprised of a film-forming metal, polyethylene oxide, and ammonium carbonate;
    pressing the powder to form an anode body; and
    heating the anode body to remove the polyethylene oxide and ammonium carbonate.

2. The method of claim 1 wherein said step of heating comprises heating to at least the melting range of polyethylene oxide.

3. The method of claim 2 wherein said step of heating comprises heating to a temperature between 50° C. and 300° C.

4. The method of claim 1 wherein said powder further includes dried fumed silica.

5. The method of claim 1 wherein said powder comprises between 94% and 98% film-forming metal, between 1% and 3% polyethylene oxide and between 1% and 3% ammonium carbonate.

6. A method of making a porous anode for an electrolytic capacitor comprising the steps of:
    providing a powder of film-forming metal particles and a binder comprised of a first substance with desirable binder properties and a second substance which in combination with the first substance is sufficiently stable at pressing temperature to permit the pressing of a strong porous anode body and, at temperatures above pressing temperature but below the temperature at which the film-forming property of the metal degrades, interacts with the first substance to produce a quantity of gas sufficient to sweep the first substance out of the pores of the anode;
    pressing the powder and binder combination to form an anode body; and
    heating the anode body to a temperature above the pressing temperature and below the temperature at which the film-forming property of the metal will degrade to remove the binder substances.

7. The method of claim 6 wherein said step of heating comprises heating to a temperature between 50° C. and 300° C.

8. The method of claim 6 wherein said second substance has a molecular weight of 96 or less.

9. The method of claim 6 wherein said second substance is one which reacts with said first substance when said first substance is in a liquid state to produce said quantity of gas, but does not so react when said first substance is in a solid state.

10. A material for use in forming anodes for electrolytic capacitors, said material comprising tantalum powder, polyethylene oxide and ammonium carbonate.

* * * * *